Nov. 29, 1955  R. W. McKILLOP  2,725,071
WATER LEVEL INDICATOR FOR CONCRETE MIXER WATER TANKS
Filed Sept. 9, 1950
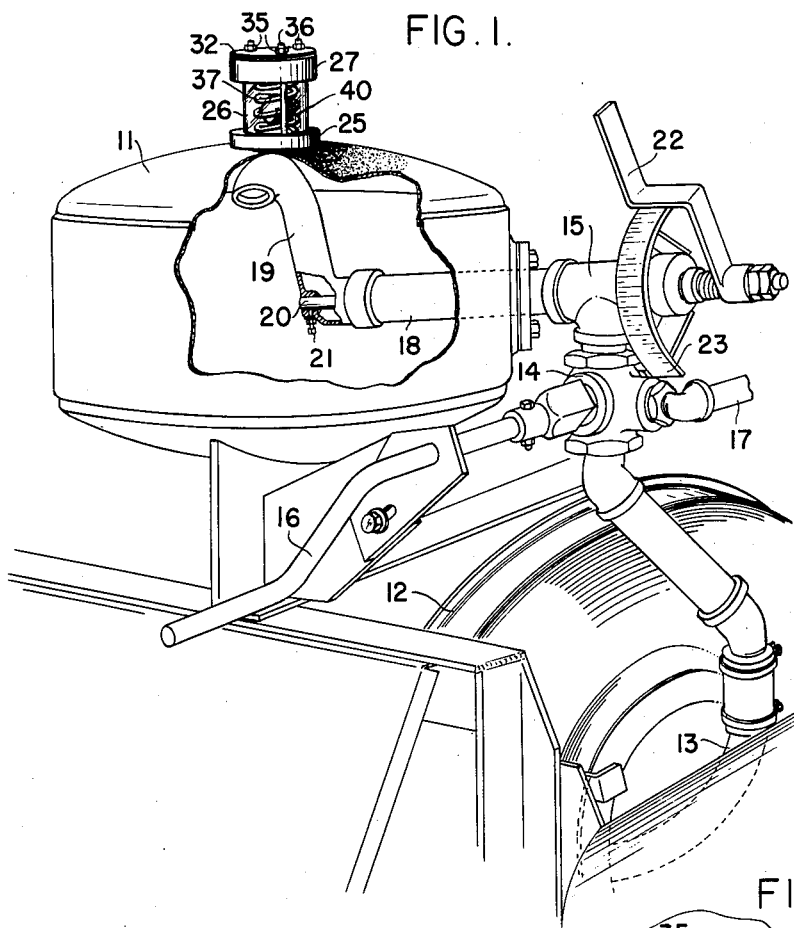
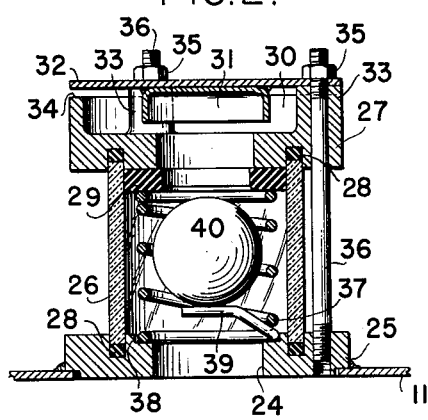
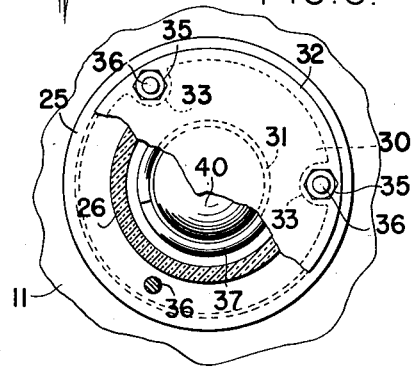
ROBERT W. McKILLOP
*INVENTOR.*
BY George A. Evans
   *ATTORNEY*

United States Patent Office 2,725,071
Patented Nov. 29, 1955

2,725,071

WATER LEVEL INDICATOR FOR CONCRETE MIXER WATER TANKS

Robert W. McKillop, South Milwaukee, Wis., assignor to Chain Belt Company, Milwaukee, Wis., a corporation of Wisconsin Application September 9, 1950, Serial No. 183,960

2 Claims. (Cl. 137—202)

This invention relates to a water level indicator comprising a check valve and a transparent housing through which its position may be observed to indicate whether or not a measuring tank of the type commonly used on concrete mixers is completely filled with water or other liquid being measured.

The valve is arranged so that during the filling or emptying of the tank air may pass through it, but as the tank becomes filled, the valve is floated upward until it engages the valve seat and prevents escape of water. Its latter position is observable through the transparent sleeve or housing that surrounds it and indicates that the tank is full, whereas as soon as any water is withdrawn from the tank, the valve falls and indicates an only partially filled condition.

The tank with which this invention is used operates on the full tank principle, i. e., it is always completely filled before any water is withdrawn. An outlet is adjusted within the tank to permit a known quantity of water to be withdrawn prior to the time when the water reaches the level of the outlet. Thus the only condition which the operator must know to successfully operate the system is that the tank is completely filled before water is withdrawn, and the present invention provides a simpler, more economical and more reliable means for indicating this condition than means heretofore employed.

The invention eliminates the necessity of having a gauge glass mounted on the side of the water tank, which was the most commonly used indicating means heretofore used. These glasses, when used on concrete mixer water tanks, were very apt to become broken, and they involve an additional item of expense. The fact that they indicate to what extent the tank is filled, when it is only partially filled, is of no advantage when the tank is operating on the full tank principle as heretofore described. There is also the danger, that water in the glass may freeze during cold weather because it is not agitated.

Preferably the float valve, which serves to check overflow of water and indicate whether or not the tank is full, is colored so as to be more visible to the operator, and being located on top of the tank it is less apt to be struck and damaged than is the gauge glass mounted on the side of the tank.

The invention is illustrated in the accompanying drawings wherein:

Fig. 1 is a perspective view of the upper portion of a concrete mixer having a water tank (partly broken away);

Fig. 2 is an enlarged side elevation in section of the check valve and housing mounted on the top of the tank; and Fig. 3 is a plan view of the apparatus shown in Fig. 2, with the top portion broken away.

As illustrated in Fig. 1, the tank generally designated 11 is mounted above the mixing drum 12, so that water may flow by gravity from the tank through the pipe 13 which leads into the interior of the drum. Water is forced into the tank 11 through the three-way valve 14 and the T-shaped fitting 15 which communicates with the interior of the tank.

Control lever 16 for the three-way valve 14 is arranged to operate the valve so that the conduit 15 may be placed in communication either with the water supply pipe 17 as when the tank is being filled, or with the discharge pipe 13, as when the contents of the tank are being discharged into the mixer drum. A pump or other source of pressure is used to force the water into the tank during the filling operation.

As illustrated in Fig. 1, there is connected to the fitting 15, a substantially horizontal pipe 18, which extends through a side of the tank 11 and carries on its inner end an oscillatable syphon elbow 19. The elbow 19 is oscillated by the shaft 20, to which it is secured by the set screw 21, shaft 20 extending through the pipe 18 and the fitting 15 and carrying at its outer end, the lever 22, which is movable along the calibrated quadrant 23 to indicate how much water will be withdrawn from the tank (assuming the tank is completely filled to start with), before the syphon is broken by the water falling below the level of the inlet portion of the elbow member 19.

Mounted on the top of the tank 11, is the water level indicator and check valve, best illustrated in Figs. 2 and 3, the construction of which constitutes the present invention.

As illustrated in said figures, the tank has a vent opening 24, provided in the washer 25 centrally located at the top of the tank, and surrounding this opening and extending upward therefrom is the sleeve 26 of plastic, transparent material, which supports the cap 27. The sleeve 26 fits in recesses in the cap 27 and the washer 25, each recess having an "O" ring 28 in its base, of rubber or similar material, to provide a water-tight fit with the sleeve when the latter is pressed between the two. Mounted on the lower side of the cap 27 is the valve seat 29 of rubber or similar material, having a passage therethrough communicating with an aligned passage in the center of the cap 27.

The upper surface of the cap 27 is recessed as at 30 to collect such small amounts of water as may escape through the valve before it is fully closed. Any surge of water through it is prevented by the downturned cup 31 mounted on the bottom of the cover plate 32, said plate resting on bosses 33 which constitute a part of the cap 27 and extend slightly above the rim portion 34 of the latter. The plate 32 is held on the bosses 33 by the nuts 35 which are threaded on the upper ends of studs 36. Studs 36 extend downwardly through openings in the bosses and into tapped holes in the washer 25. Tightening of the nuts 35 clamps the sleeve 26 tightly between the cap 27 and the washer 25.

Arranged within the sleeve 26 is a valve cage 37, which may be a simple coil spring, one end of which is retained in a recess 38 in the washer 25 and the other end of which bears against the valve seat 29. Resting on the in-turned end portion 39 of the spring 37 (when the tank is not filled) is a hollow ball valve 40 which is free to move vertically within the cage formed by the spring but which is sufficiently confined thereby so that it cannot fall through the opening 24 into the tank. The cake also serves to guide the ball into the seat 29 when it is lifted by water rising in the valve chamber.

As previously mentioned, the water system operates on the full tank principle. The lever 22 is first set so that the desired quantity of water may be withdrawn after each filling of the tank. The control lever 16 is next moved to admit water into the tank and after the water has completely filled the tank, it rises in the sleeve 26, floats the check valve 40 upwardly with it and eventually seats the valve against the valve seat 29. Since the sleeve 26 is transparent, the operator observes the fact that the ball has reached its uppermost position and knows that the tank may be emptied and that the desired quantity will be withdrawn before the syphon is broken. Naturally air passes through the valve during the filling and withdrawing of water because, except when the tank is filled, the valve 40 is in lowered position and air may freely pass around it without disturbing its position.

The ball valve 40 is preferably colored to make its position in the sleeve 26 more clearly visible to the operator.

The invention having been described, what is claimed is:

1. In a water level indicator for use with a water supply tank for concrete mixers and the like operating on the full tank principle and having a vent opening in its upper portion, apparatus for indicating directly whether the water tank is full or less than full to determine whether or not an accurately measured quantity of water can be withdrawn from the tank into the mixer comprising: a transparent cylindrical housing arranged above said vent opening; a cap mounted on the upper end of said housing having an air passage therethrough and a downwardly turned cup arranged above said passage for dissipating the force of upwardly surging water, said cap having an upstanding, surrounding rim for retaining water escaping through said passage before the valve is closed; a valve seat arranged within said housing adjacent its upper extremity communicating with the passage through said cap; a buoyant valve body confined within said transparent cylindrical housing arranged when buoyed by water to engage said seat and close said air vent; a resilient valve cage bearing against said seat and having a portion supporting said body in spaced relation from the seat when the body is not buoyed, said body being visible within said transparent housing to indicate by its position at the top thereof that the water tank is full of water; and means maintaining said cap and housing in sealed tight, assembled relationship communicating with the tank vent opening, said last mentioned means being capable of ready disassembly to permit cleaning of said housing to maintain the visibility of the buoyant body therein.

2. In a water level indicator for use with a water supply tank for concrete mixers and the like operating on the full tank principle and having a vent opening in its upper portion, apparatus for indicating directly whether the water tank is full or less than full to determine whether or not an accurately measured quantity of water can be withdrawn from the tank into the mixer comprising: a transparent cylindrical housing arranged above said vent opening; a cap mounted on the upper end of said housing having a passage therethrough communicating with the inside of said housing, said cap having an upstanding peripheral rim, a downwardly turned cup member supported on said cap and spaced from certain portions thereof to permit escape of air, said cup being arranged to intercept and dissipate the force of upwardly surging water escaping through said passage before the valve is closed; a valve seat arranged within said housing adjacent its upper extremity communicating with the passage through said cap; a buoyant valve body confined within said transparent cylindrical housing arranged when buoyed by water to engage said seat and close said air vent; a resilient valve cage bearing against said seat and supporting said body in spaced relation to the seat when the body is not buoyed, said body being visible within said transparent housing to indicate by its position at the top thereof that the water tank is full of water; tensioning members engaging said tank and extending through said cap, and tensioning means engaging said tension members to maintain the housing in sealed tight engagement between the cap and the tank, said last mentioned means being capable of ready disassembly to permit cleaning of the housing to maintain the visibility of the buoyant body therein.

References Cited in the file of this patent

UNITED STATES PATENTS

| | | |
|---|---|---|
| 340,226 | Lindsley | Apr. 20, 1886 |
| 482,171 | Guasco et al. | Sept. 6, 1892 |
| 542,516 | Brooks | July 9, 1895 |
| 598,345 | Kellam | Feb. 1, 1898 |
| 687,395 | Douglas | Nov. 26, 1901 |
| 1,056,238 | Walter | Mar. 18, 1913 |
| 1,486,985 | Monahan | Mar. 18, 1924 |
| 1,936,975 | Wasson | Nov. 28, 1933 |
| 2,388,432 | Nelson | Nov. 6, 1945 |

FOREIGN PATENTS

| | | |
|---|---|---|
| 326,936 | Germany | Oct. 7, 1920 |